Sept. 13, 1960  J. W. MURRY  2,952,359
HEAVY SOLID MIXTURE CLASSIFICATION
Filed Dec. 7, 1956  2 Sheets-Sheet 1

INVENTOR.
JAMES W. MURRY.
BY Christy, Parmelee & Strickland
ATTORNEYS.

Sept. 13, 1960 J. W. MURRY 2,952,359
HEAVY SOLID MIXTURE CLASSIFICATION
Filed Dec. 7, 1956 2 Sheets-Sheet 2
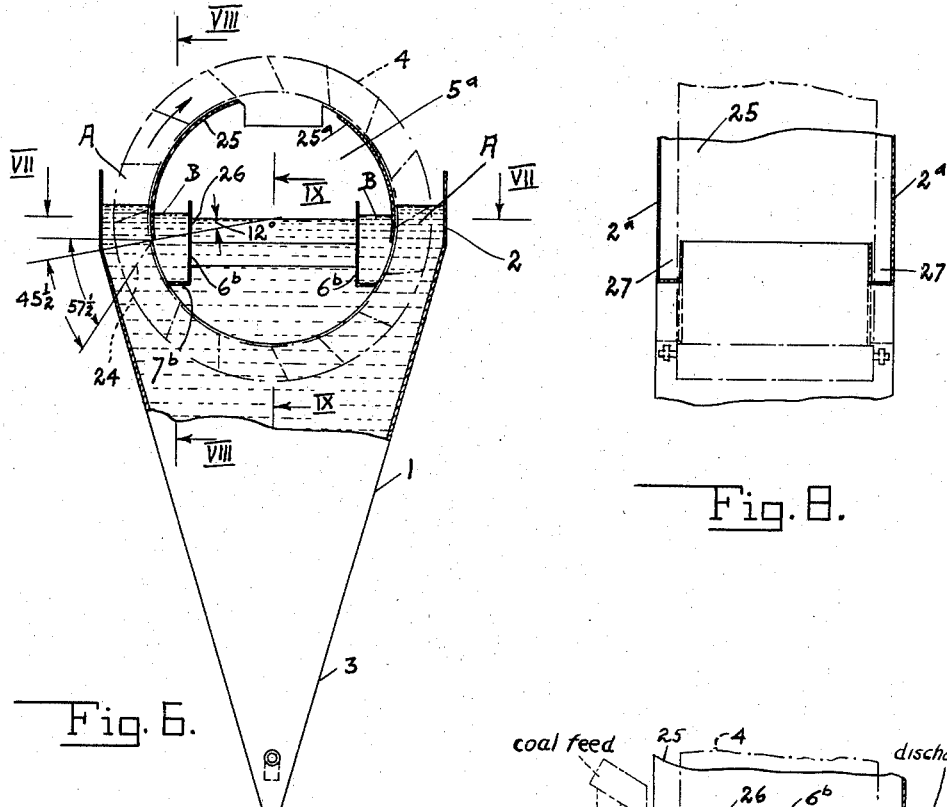
Fig. 6.
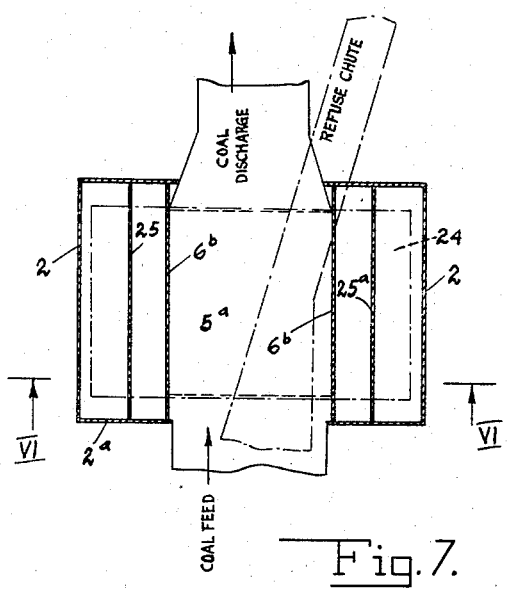
Fig. 7.
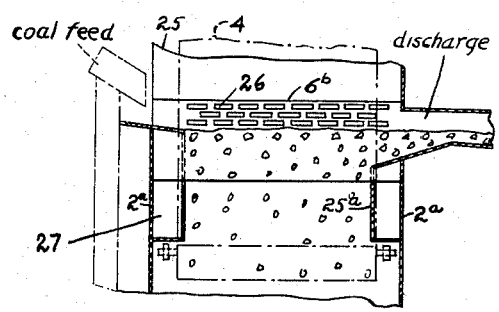
Fig. 8.
Fig. 9.
INVENTOR.
JAMES W. MURRY.
BY
Christy Parmelee & Strickland
ATTORNEYS.

United States Patent Office 2,952,359
Patented Sept. 13, 1960

2,952,359

HEAVY SOLID MIXTURE CLASSIFICATION

James W. Murry, 803 Benoni Ave., Fairmont, W. Va.

Filed Dec. 7, 1956, Ser. No. 626,947

4 Claims. (Cl. 209—172.5)

This invention relates to the classification of heavy solid mixtures such as coal, ores and the like into products of different specific gravities by means of a mixture of sand and water.

The invention is an improvement in the apparatus described and claimed in my issued Patents 2,733,810 and 2,733,811 dated February 7, 1956. Reference is made to these patents for details of construction and operation of those portions of the apparatus not specifically described herein and not forming a part of the present invention.

The invention defined in my issued patents utilizes a comparatively deep bed of a sand-water float media which is of a substantially uniform specific gravity throughout the major portion of the body thereof. A separating compartment is disposed across the upper portion of the media and has a uniform cross sectional area throughout the entire height of portion of the body of float media therein. Such a separating compartment is disposed within an open ended cylindrical rotating cage which receives the heavy sink material passing down through the sand-water float media and disposes of same without disturbing the specific gravity of the media. Such design however creates a situation wherein the body of float media within the separating compartment is of lower specific gravity than the body of float media below such compartment.

The principal object of the present invention is to provide an improved design of separating compartment which makes possible increasing of the maximum specific gravity of the float media within the separating compartment and to effect a substantially uniform specific gravity throughout the entire body of the float media within and below the separating compartment.

This and other objects of the invention will be made apparent from the appended specification and the drawing forming a part thereof, wherein:

Fig. 6 shows a transverse section through a modified form of the classifying chamber of Fig. 2;

Fig. 7 shows a plan view of the classifying chamber of Fig. 6;

Fig. 8 shows a section taken on lines VIII—VIII of Fig. 6; and

Fig. 9 shows a section taken on lines IX—IX of Fig. 6.

Figure 1:
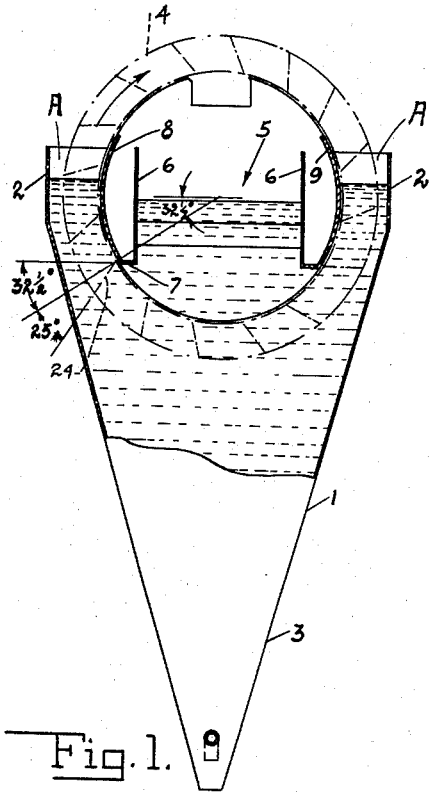
Fig. 1 shows a transverse section through the classifying chamber of the type disclosed in Patent 2,733,811.
Figure 3:
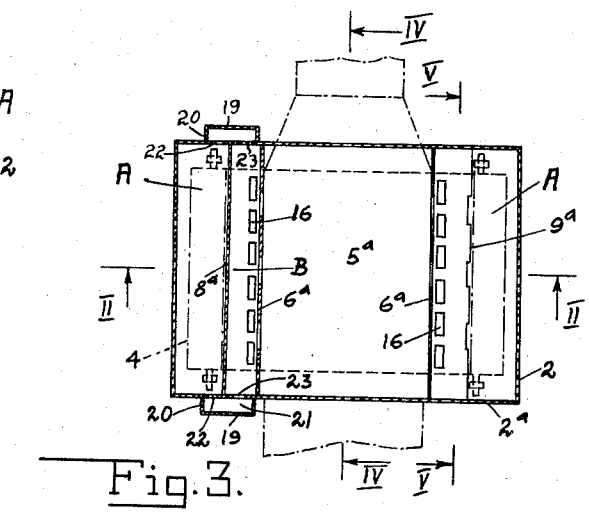
Fig. 3 shows a plan view of the classifying chamber of Fig. 2.
Figure 4:
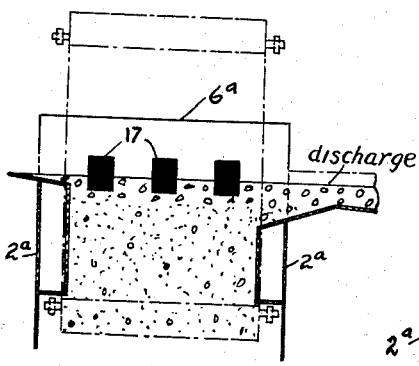
Fig. 4 shows a section taken on lines IV—IV of Fig. 3.
Figure 5:
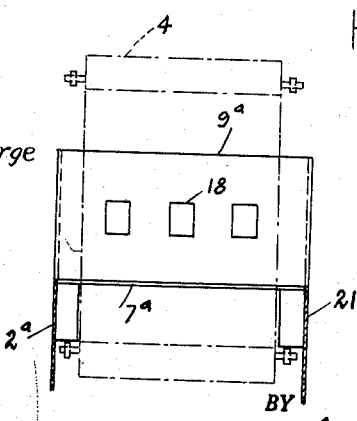
Fig. 5 shows a section taken on lines V—V of Fig. 2.

Referring now in detail to Figs. 1 to 5 inclusive of the drawings, Fig. 1 shows a transverse section through a classifying chamber of the type shown in Fig. 4 of my prior Patent 2,733,811, and Figs. 2 to 5 inclusive disclose an improvement over such classifying chamber. In Fig. 1 the classifying chamber indicated generally by the reference character 1 is shown in cross section and is defined by substantially vertical upper side wall portions 2, end wall portions 2a and converging side wall portions 3. The classifying chamber 1 has an open top into which extends an annular basket elevator 4 which encloses a classification compartment 5, the width of which is defined by spaced vertical side plates 6 having laterally extending bottom walls 7 and provided with upwardly curved guard walls 8 and 9 which enclose the adjacent sides of the annular basket elevator 4 in the vicinity of the classification compartment. Within the classification chamber 1 is maintained a sand-water mixture of a substantially uniform controlled specific gravity below the compartment, which mixture extends upwardly into the classification compartment 5 to a height sufficient to carry the raw coal within the compartment out over a suitable weir as described in the aforementioned patent. Water also stands in the areas A between the plates 8 and 9 and the adjacent chamber side walls 2. By reason of there being no provision for flow of water out of these areas there is no sand suspended in the water of areas A. The water in areas A and the sand-water mixture in the washing area are connected below the plate 7 at the bottom of the washing area so as to be in hydraulic balance. As a result of the differences in specific gravity, the water in the areas A stands at a greater vertical height than does the sand-water mixture in the washing area between the plates 6. The specific gravity of the sand-water float media within the compartment 5 is less than that of the sand-water float media below.

The reason for the differences in specific gravity of the sand-water mixture within the classification compartment 5 and the remaining portions of the sand-water mixture in the classification chamber 1 is readily apparent.

The specific gravity of the sand-water mixture within the classification chamber 5 is established by the rate of flow of water upwardly through the chamber. The higher the rate of flow the lower the specific gravity of the mixture. It has been determined by experimentation that the maximum usable specific gravity in the classification chamber of a classifier of the design disclosed is about 1.60. It is possible to obtain a sand-water mixture of between 1.80 and 1.90. Between the specific gravity of 1.60 and the higher limit the mixture changes from a fluid to a quite viscous mixture and ultimately to a settled mass. Since the refuse basket must operate in the maximum specific gravity within the classification chamber the specific gravity must be maintained at a level which will provide a fluid mixture within the chamber. Hence about 1.60 is the maximum usable specific gravity in this type of construction. By reason of the width of the classification compartment 5 being substantially less than the maximum width of the classification chamber 1 immediately below the compartment 5, the volume of water admitted to the classification chamber can only flow upwardly and outwardly through the classification compartment. The volume of water, in gallons per minute per square foot of area, moving through the compartment is therefore greater than that of the water moving through the chamber, which condition causes a lower specific gravity within the compartment than in the larger chamber. Hence the maximum operating specific gravity can be raised if a higher specific gravity of the float media could be maintained in the separating compartment 5 without a corresponding increase of specific gravity in the media below this compartment 5.

Figure 2:
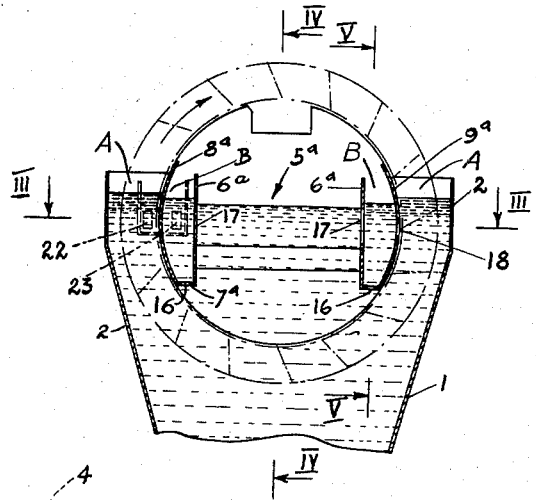
Fig. 2 shows a transverse section through the improved classifying chamber of the invention.

Referring now to Figs. 2 to 5 inclusive of the drawings, it will be observed that in my improved design I have provided for a flow of water out of the areas A at each side of the classification compartment through the areas B into the classification compartment 5a. By this means I have been enabled to obtain a substantially uniform specific gravity of the sand-water throughout the entire classification chamber and a resulting higher specific gravity of the mixture within the classification compartment. As shown in Figs. 2 and 3 of the drawings, substantially rectangular openings 16 have been provided in the plates 7a at the bottom of the classification compartment providing for an upward flow of the water from chamber 1 into the areas B. Openings 17 in the side plates 6a of the compartment 5a permit water flowing upwardly through openings 16 to enter the sand-water mixture of the washing area of compartment 5a. By locating these openings 17 at the liquid level in the washing area the water moving from areas B enters into the top of the washing area instead of passing therethrough thus not affecting the specific gravity of the float media in the washing area. When openings 18 are also placed in guard plate 9a, at the right side of Fig. 2, some of the water below the compartment 5a can now move upwardly into the adjacent area A, through openings 18 into area B and out through openings 17 into the classification compartment 5a. Since water flowing upwardly from chamber 1 through opening 16 can enter compartment 5a through opening 17 and circulation has been established between the area A and the area B at one side of said compartment, sand is now suspended in the water of the said areas A and B creating a new condition of hydraulic balance. The water-sand mixture in area B will be slightly higher than in the washing area between the plates 6a and this difference in height provides a head to force the water through to the openings 17 into the washing area. The conditions thus described are readily obtainable at the right side of Figs. 2 and 3 in the manner described, but by reason of the necessity for eliminating openings in the guard plate 8a at the left side of Fig. 2 a different structural arrangement is necessary. Openings in the plate 8a similar to the openings 18 in the plate 9a would allow refuse to shift from the basket flights of the elevator 4 and get caught between the upper edge of such plate openings and the edges of the elevator. Also some refuse might fall from the elevator at such openings into the area B and if too large to pass through the openings 16 would remain there to plug the area B. Therefore, a different arrangement is made whereby a flume or box is mounted at each end of the left side of the classification compartment to bridge the areas A and B as shown in Figs. 2 and 3. Such flume is comprised of an end wall 19, side walls 20 and bottom wall 21. By then forming openings 22 and 23 in the vertical walls 2a of the chamber 1 water from area A will readily flow into area B and outwardly through the opening 17 onto the top of the sand-water in the classification compartment between the plates 6a. Due to the nature of these openings 22 and 23, there may be a slightly higher resistance to the flow of the sand-water mixture on the left side of Fig. 2 as compared to the right side of the same figure, but this slight difference will not cause any material unbalancing of the specific gravity of the mixture in the washing area of the classification compartment. Care must be taken in providing this improved flow of the water through the classification compartment to avoid getting large pieces of refuse or coal into the areas A and B at the left side of Fig. 2. Any material falling into the area A at the left side of Fig. 2 would fall to the bottom of the chamber 1 and would have to be removed by the fine refuse pump at the bottom. This pump is quite small and large pieces would tend to plug the pump. Likewise any large pieces of refuse or coal falling into the area B and not passing through the openings 16 would tend to plug this area. Smaller sized pieces of course would readily pass through the openings 16 and would fall from there into the refuse basket. Likewise at the right hand side of the Fig. 2 refuse passing into the areas B and A of a sufficient size to pass the openings 16 and 18 would readily fall into the refuse basket. To prevent movement of large particles into areas A or B, openings 17 and 23 may be screened.

Referring now to Figs. 6 to 9 of the drawings, a further and preferred modification of the invention of Fig. 1 is disclosed. This improvement is obtained by changing only the curved plate and the angularity of the flights of the refuse elevator or basket 4. In Fig. 1 of the drawings, the point where the inner surface of the flight 24 enters behind the curved plate 8 is 32½° below horizontal measured on a radial line through the axis of rotation of the basket, and the flights are shown at an angle of 25° from the radial line so that the flight is disposed at an agle of 57½° below horizontal. This angularity or a substantially similar amount is considered necessary to provide a pocket between the flight and the smooth cloth covering the basket to contain sink material in such a position that when the flight passes back of the curved plate there will be no interference between movement of the basket containing sink material and the fixed curved plate. Any lesser angle might allow the sink material to project beyond the inner edge of the flight and be caught in a shearing position when passing back of the curved plate.

As shown in Fig. 6 it is proposed to change the angle between the flight 24 and radial line to 45½° which will allow raising the bottom of the curved plate 25 to a position of 12° below horizontal and still maintain an angle of flight 57½° between horizontal and the point where the flights start in behind the curved plate. The position of the partition plates 6b defining the classification compartment and the bottom closure plate 7b are not changed thereby providing a large opening between the areas A and B permitting free upward flow of the water into both of these areas. By providing a plurality of openings 26 in the partition plate 6b with the bottommost openings being at substantially the water line in the washing area between partition plates 6b, a flow of water out of area B into the washing area is obtained. This construction permits no flow of water from the area A into the area B above the bottom point of the curved plates 25 and 25a so that a new hydraulic balance is established above this bottom point of the said plates. Thus the water in the area A above such point would be entirely clear water containing no sand and standing at a height greater than the height of the sand-water mixture in the area B. By reason of the location of the perforations 26 in the partition plates 6b the sand-water mixture in area B stands higher than the sand-water mixture between the partition plates 6b. This provides a head of water in the area B to force the water out of the area B through the perforations 26 across the top of the sand-water mixture in the washing area. Due to the increased angularity of the flight 24 it may be necessary to increase the width of the refuse chute so as to receive all refuse moving off the flights as shown in Fig. 7 of the drawings. The constructions at both the left and right side of Fig. 6 are therefore the same.

Referring now to Fig. 8 of the drawings, by reason of the length of the refuse basket being less than the length of the washing chamber it will be necessary to extend the plate 25 and 25a downwardly at 27 at the space between the refuse basket and the sides of the classification chamber to a point where they engage with the plate 7b at the bottom of the classification chamber. Referring now to Fig. 9 of the drawings, the vertical plate 6b defining the width of the classification compartment extends the full width of the classification chamber and the extensions of plate 25 and 25a below plate 6b to close off the area between the refuse basket and the side of the chamber is illustrated.

Referring again to Fig. 7 of the drawings, by reason of the change of angle of the flights 24 the refuse chute shown in dot and dash lines is widened so as to receive the last portion of the refuse moving off the flight plate 24 before passing behind the curved plate 25a.

As shown in Figs. 6 and 9 of the drawings, the upwardly moving water within the classification chamber 1 flows upwardly concurrently between the plate 25 and 6b in area B and between the plate 25 and the adjacent side of the chamber in area A. The water in the area A having no flow out of the area above the bottom of plate 25 is of greatest height and is clear water since, being stagnant, it can not suspend the sand. The water in area B flowing upwardly and out through the perforations 26 will stand slightly higher than the sand-water mixture in the washing area. These three heights of fluid are resulting from the hydraulic balance established beneath the areas A and B in relation to the over-flow lip line at the end of the weir as the cleaned coal passes out of the classification compartment. The slight difference in height between the sand-water mixture in the washing compartment and in the area B provides a head to force the water out of the compartment B through the perforations 26.

The exact details of construction shown herein are for the purpose of illustrating the improvement of the invention as disclosed in detail in my Patent 2,733,811. It will be readily apparent however that the principles of operation thus disclosed may be retained while departing from the exact details of construction used to illustrate the improvement described and claimed herein.

I claim:

1. Apparatus of the character described for making density classification of a mixture of solids of different densities, comprising a vertically disposed chamber having connected side and end walls wherein a sand-water mixture of controllable specific gravity is continuously formed, said chamber having an open top, a pair of laterally spaced vertically disposed plate members within said chamber and extending above and below the level of the sand-water mixture in said chamber forming the sides of an open bottom classification compartment, each of said compartment plates extending continuously between the chamber end walls in spaced relation to the chamber side walls, a connection between the ends of each said plate and the adjacent chamber end walls, an opening in one of said chamber end walls between said side plates for discharge of the sand-water mixture from the classification department, an annular rotatable refuse elevator disposed within said chamber and having a horizontal axis of rotation extending longitudinally of said compartment, said elevator encircling said compartment side plates in spaced relation thereto, each said side plate having a horizontally disposed plate connected to the bottom thereof and extending therefrom to the adjacent side of the elevator, a curved guard plate disposed in longitudinally spaced relation to each said compartment side plate and extending between the chamber end walls adjacent the elevator, each said guard plate having its top portion extending above the adjacent compartment side plate and its bottom portion terminating above the adjacent bottom plate secured to the adjacent compartment side plate, each said compartment side plate having a plurality of longitudinally spaced apertures therein disposed adjacent the water line of the sand-water mixture flowing through said classification compartment.

2. Apparatus of the character described for making density classification of a mixture of solids of different densities, comprising a vertically disposed chamber having connected side and end walls within which a sand-water mixture of controlled specific gravity is continuously being formed, a pair of vertically disposed laterally spaced plates extending transversely of the mid-portion of said chamber between said chamber end walls providing an open-bottom classification compartment extending above and below the level of the sand-water mixture within the chamber, one said chamber end wall between said compartment side plates being provided with an opening for discharge of the sand-water mixture flowing upwardly from said chamber into said compartment, a vertically disposed guard plate extending longitudinally of each said side plates in spaced relation thereto and to the adjacent chamber side wall, the opposite ends of each said guard plate being connected to the adjacent chamber end walls, a horizontally disposed bottom plate connecting the bottom edges of the adjacent guard and side plates at each side of said compartment, a plurality of apertures spaced longitudinally of each said bottom plate for admission of sand-water mixture between the connected guard and side plates, an annular rotatable refuse elevator within said chamber encircling said classification compartment in spaced relation to each said guard plate and to the adjacent chamber side wall, flume means disposed on the outer face of each chamber end wall at the sides thereof wherein the rotatable elevator approaches the sinks discharge chute, each said flume means extending transversely of the end of the adjacent guard plate, apertures in each said chamber end wall on opposite sides of said guard plate at said flume means, the guard plate at the opposite side of the chamber being provided with a plurality of longitudinally spaced apertures adjacent the level of the sand-water mixture extending between the latter guard plate and the adjacent compartment side wall, and each said compartment side plate being provided with a plurality of longitudinally spaced apertures disposed adjacent the level of the sand-water mixture within said compartment.

3. Apparatus as in claim 2, wherein each said flume means comprises a bottom member extending transversely of the adjacent end of the guard plate and secured to the outer face of the chamber end wall below the level of the sand-water mixture within said chamber, side members extending upwardly at each end of the said flume bottom member and secured to the adjacent face of the chamber wall, and an end member connecting said flume side and bottom members.

4. Apparatus as defined in claim 1, wherein the bottom edge of the guard plates terminate at an angle of about 12° to the horizontal measured on a radial line from the axis of rotation of the elevator to the bottom edge of the guard plate.

References Cited in the file of this patent

UNITED STATES PATENTS 2,521,152    Davis    Sept. 5, 1950
2,733,811    Murry    Feb. 7, 1956